(No Model.)
A. D. REYNOLDS.
ANIMAL SHEARS.
No. 499,938. Patented June 20, 1893.
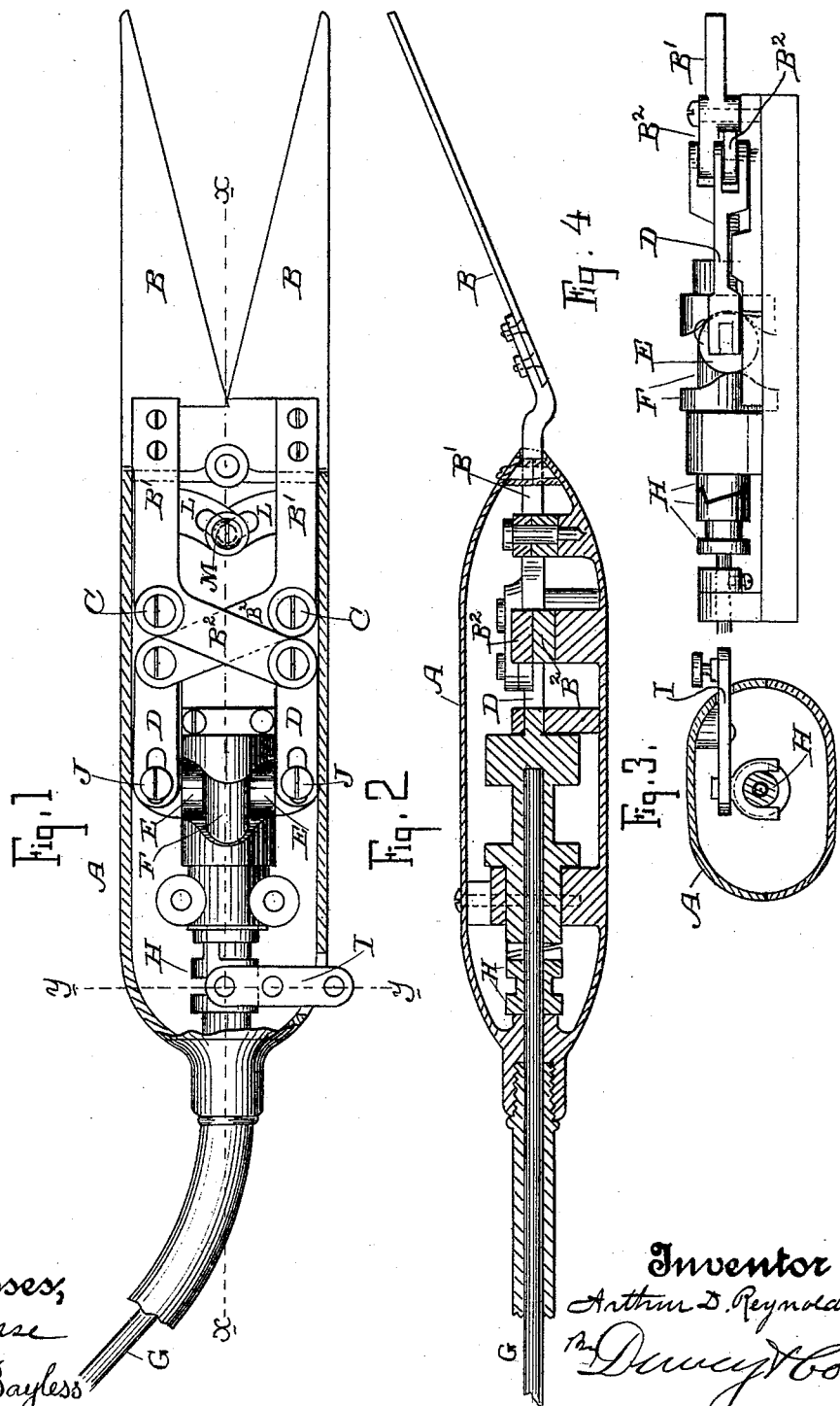

UNITED STATES PATENT OFFICE.

ARTHUR D. REYNOLDS, OF SAN FRANCISCO, CALIFORNIA.

ANIMAL-SHEARS.

SPECIFICATION forming part of Letters Patent No. 499,938, dated June 20, 1893.

Application filed September 27, 1892. Serial No. 447,059. (No model.)

*To all whom it may concern:*

Be it known that I, ARTHUR D. REYNOLDS, a citizen of England, residing in the city and county of San Francisco, State of California, have invented an Improvement in Sheep-Shears; and I hereby declare the following to be a full, clear, and exact description of the same.

My invention relates to a sheep shears and a mechanism for operating the same; and it consists in certain details of construction which will be more fully explained by reference to the accompanying drawings, in which—

Figure 1 is a plan view with the top removed. Fig. 2 is a longitudinal vertical section taken through the line $x$—$x$ of Fig. 1. Fig. 3 is a section taken through line $y$—$y$ of Fig. 1. Fig. 4 is a side view, the case and blades being removed.

The object of my invention is to provide a novel mechanism in connection with cutting shears whereby the jaws of the latter may be reciprocated at a rapid rate of speed. Also a means for disengaging the driver at will, and means for guiding the reciprocating parts, and for retaining the jaws of the blades closely together.

A is a case of any suitable form and construction adapted to contain an operative mechanism. This case is preferably made so as to be entirely closed to keep the mechanism free from dirt and prevent its becoming entangled.

B B are the blades of the shears which extend out from one end of the case and have their shanks or extensions pivoted or fulcrumed as shown at C. The blades themselves may be made separate from the shanks and bolted thereto by means of bolts having countersunk heads passing through the lower surface of the rear end of the blades, and having nuts upon the top by which they are firmly secured, thus leaving the lower surface of the blades smooth and flush, and approximately continuous with the front tapering end of the case so as to prevent any projections which may become entangled with the wool or hurt the skin of the animal to be sheared. From the fulcrum points of the shanks B' arms B² cross each other, and are connected with the sliding links D. These links have pivoted to them rollers or slides E which fit into the groove of a cam F. This cam is suitably journaled within the case A and has a shaft or shank extending out through the rear end through which power may be applied to drive it. This shaft may be turned by a crank by hand, or driven by any suitable power. I prefer to employ a flexible shaft G, such as is well known for driving dental and other instruments and which connects with the end of a shaft within the casing.

Upon the shaft within the casing is fixed a sliding clutch H adapted to engage the corresponding member which is fixed to the cam proper, so that when the two members of the clutch are engaged, the cam will be rotated and cause the slides D to reciprocate, thus communicating motion to the shear blades.

The clutch is operated and thrown into or out of gear by means of a lever I projecting through the side of the case and having a suitable knob by which to operate it.

The slides D are shown in the present case as slotted, the slotted ends fitting over guide pins J which keep them in place in their reciprocations, and they are also prevented from side movement by guide blocks upon the sides fitting into slots or grooves which are chambered out in the sides of the links to receive these blocks.

In order to keep the shear blades closely together plates L projecting inwardly from the shanks B' and crossing each other at the center are shown. These plates are slotted and a pin or bolt M passing through the slots prevents the blades from being separated, thus retaining the edges in close contact with each other so that they will cut properly at all times.

Having thus described my invention, what I claim as new, and desire to secure by Letters Patent, is—

1. A shearing device consisting of blades, the shanks of which are fulcrumed within the case, and arms rigidly connected with the shanks at the fulcrum point crossing each other, links connected with the ends of the arms movable upon guides and having projections at their inner ends, a grooved cam journaled to rotate within the case, projections from the links entering the groove of the cam so as to be actuated thereby, a shaft extending through the rear of the case whereby power is derived to rotate the cam, and a clutch by which said rotary shaft is connected with or disconnected from the cam, substantially as herein described.

2. A shearing apparatus consisting of a case containing a rotary cam, a flexible shaft extending through the rear of the case, and a clutch whereby it may be thrown into or out of engagement with the cam, shear blades having their shanks fulcrumed within the case and arms crossing each other from the fulcrum points, intermediate links movable upon guides and having projections from their rear ends which enter the groove of the cam whereby the links are reciprocated and the shear blades oscillated, and plates L and pin M whereby the edges of the blades are adjusted and retained in operative contact, substantially as herein described.

In witness whereof I have hereunto set my hand.

ARTHUR D. REYNOLDS.

Witnesses:
S. H. NOURSE,
J. A. BAYLESS.